(12) United States Patent
Riley

(10) Patent No.: US 10,087,303 B2
(45) Date of Patent: Oct. 2, 2018

(54) POLYMER COMPOSITION COMPRISING INORGANIC PARTICULATE FILLER

(71) Applicant: Imerys Minerals Limited, Par Cornwall (GB)

(72) Inventor: Andrew Mark Riley, St. Columb Major (GB)

(73) Assignee: Imerys Minerals Limited, Par Cornwall (GB)

( * ) Notice: Subject to any disclaimer, the term of this patent is extended or adjusted under 35 U.S.C. 154(b) by 0 days.

(21) Appl. No.: 15/309,669

(22) PCT Filed: May 7, 2015

(86) PCT No.: PCT/GB2015/051340
§ 371 (c)(1),
(2) Date: Nov. 8, 2016

(87) PCT Pub. No.: WO2015/170103
PCT Pub. Date: Nov. 12, 2015

(65) Prior Publication Data
US 2017/0267830 A1   Sep. 21, 2017

(30) Foreign Application Priority Data
May 8, 2014 (GB) .................................. 1408167.3

(51) Int. Cl.
*C08L 9/00* (2006.01)
*C08K 3/34* (2006.01)
*C08K 3/36* (2006.01)

(52) U.S. Cl.
CPC .......... *C08K 3/36* (2013.01); *C08K 2201/005* (2013.01); *C08K 2201/006* (2013.01)

(58) Field of Classification Search
CPC ... C08K 3/0033; C08K 2201/006; C08L 9/00; C08L 9/06
See application file for complete search history.

(56) References Cited

U.S. PATENT DOCUMENTS

| | | | | |
|---|---|---|---|---|
| 4,594,213 A | * | 6/1986 | Ealer | C08J 5/18 264/210.6 |
| 5,700,853 A | * | 12/1997 | Yoshida | C08K 3/36 523/204 |
| 8,993,666 B2 | * | 3/2015 | Miyazaki | C08L 81/02 524/425 |
| 2012/0071573 A1 | | 3/2012 | Feichtinger et al. | |

FOREIGN PATENT DOCUMENTS

| | | | | |
|---|---|---|---|---|
| CN | 101590374 A | 12/2009 | | |
| CN | 101918226 A | 12/2010 | | |
| CN | 101932642 A | 12/2010 | | |
| CN | 102851788 A | 1/2013 | | |
| CN | 103232700 A | 8/2013 | | |
| EP | 2 231 422 A1 | 9/2010 | | |
| EP | 2 578 626 A1 | 4/2013 | | |
| EP | 2 818 505 A1 | 12/2014 | | |
| JP | 2009-167290 A | * | 7/2009 | ............... C08L 9/00 |
| WO | WO 2009/080091 A1 | * | 7/2009 | ............... C08K 3/36 |
| WO | WO 2009/080144 A1 | | 7/2009 | |

OTHER PUBLICATIONS

International Search Report and Written Opinion dated Jul. 20, 2015, in International PCT Application No. PCT/GB2015/051340, filed May 7, 2015.
"Non-metallic Mineal Filler and Processing Technology", Jizu Yuan, pp. 25-26, Chemical Industry Press, Jan. 2007.

* cited by examiner

*Primary Examiner* — Rip A Lee
(74) *Attorney, Agent, or Firm* — Finnegan, Henderson, Farabow, Garrett & Dunner LLP

(57) ABSTRACT

An inorganic particulate material such as diatomaceous earth, a polymer composition comprising a polymer and the inorganic particulate material and an article or product formed from said composition, use of the inorganic particulate material such as diatomaceous earth as a filler in a composition comprising a polymer, and a method of making a polymer composition and an inorganic particulate material.

14 Claims, 2 Drawing Sheets

POLYMER COMPOSITION COMPRISING INORGANIC PARTICULATE FILLER

This application is a U.S. national phase entry under 35 U.S.C. § 371 from PCT International Application No. PCT/GB2015/051340, filed May 7, 2015, which claims the benefit of priority of GB Application No. 1408167.3, filed May 8, 2014, both of which are incorporated herein by reference.

FIELD OF THE INVENTION

The present invention relates generally to inorganic particulate materials such as diatomaceous earth and polymer compositions comprising a polymer and inorganic particulate materials (e.g. diatomaceous earth) and articles or products formed from said compositions. The present invention further relates to the use of inorganic particulate materials (e.g. diatomaceous earth) as a filler in a composition comprising a polymer. The present invention additionally relates to a method of making a polymer composition comprising a polymer and an inorganic particulate material (e.g. diatomaceous earth) and a method of making an inorganic particulate material (e.g. diatomaceous earth).

BACKGROUND OF THE INVENTION

Inorganic particulate materials may be added to polymers to improve their properties and/or to reduce cost by reducing the amount of polymer used in the composition. Diatomaceous earth is one example of an inorganic particulate material that may be added to polymers. Diatomaceous earth, also known as DE, diatomite and kieselgur, is a naturally occurring soft sedimentary rock. It is principally composed of the silica microfossils of aquatic unicellular algae known as diatoms. Diatomaceous earth typically has a chemical composition in the range of about 60 to 95% silica, 1 to 12% alumina and 0.5 to 8% iron oxide. It may also contain small amounts of other compounds such as calcium oxide, titanium dioxide, magnesium oxide, sodium oxide and potassium oxide. Diatomaceous earth has a highly porous structure, for example containing up to 80 to 90% voids, and consists of particles of a wide variety of shapes and sizes.

Diatomaceous earth demonstrates good sorption ability, chemical inertness and low density. It may be used as a filter-aid in the processing of liquid foodstuffs and chemical fluids, as a filler in plastics and paints, and as a raw material for the production of insulation bricks. The use of diatomaceous earth as a filler may affect properties such as colour, oil absorption, surface wetting and bonding, chemical resistance and mechanical properties (e.g. physical strength) of the materials in which they are used.

It may be desirable to provide at least an alternative inorganic particulate material (e.g. an alternative diatomaceous earth) suitable for use as a filler in various compositions, for example as a filler in polymer compositions. It may also be desirable to provide an improved inorganic particulate material (e.g. an improved diatomaceous earth) for use as a filler in various compositions, for example as a filler in polymer compositions. Since diatomaceous earth is often relatively cost-effective in comparison to other inorganic particulate fillers such as kaolin, calcium carbonate and silica, it may be desirable to provide an alternative and/or improved diatomaceous earth which could be used to partially or completely replace other fillers in a composition, for example in a polymer composition.

SUMMARY OF THE INVENTION

In accordance with a first aspect of the present invention, there is provided a polymer composition comprising a polymer and an inorganic particulate material, wherein the inorganic particulate material has a surface area equal to or greater than about 30 $m^2g^{-1}$. In a particular embodiment of the first aspect of the present invention, there is provided a polymer composition comprising a polymer and diatomaceous earth, wherein the diatomaceous earth has a surface area equal to or greater than about 30 $m^2g^{-1}$.

In accordance with a second aspect of the present invention, there is provided an inorganic particulate material having a surface area equal to or greater than about 30 $m^2g^{-1}$. In a particular embodiment of the second aspect of the present invention, there is provided a diatomaceous earth having a surface area equal to or greater than about 30 $m^2g^{-1}$.

In accordance with a third aspect of the present invention, there is provided a use of an inorganic particulate material having a surface area equal to or greater than about 30 $m^2g^{-1}$ as a filler in a composition comprising a polymer. In a particular embodiment of the third aspect of the present invention, there is provided a use of a diatomaceous earth having a surface area equal to or greater than about 30 $m^2g^{-1}$ as a filler in a composition comprising a polymer.

In accordance with a fourth aspect of the present invention, there is provided a method of making a composition of the first aspect of the present invention comprising obtaining an inorganic particulate material (e.g. diatomaceous earth) having a surface area equal to or greater than about 30 $m^2g^{-1}$ and combining the inorganic particulate material (e.g. diatomaceous earth) with a polymer.

In accordance with a fifth aspect of the present invention, there is provided a method of making an inorganic particulate material (e.g. diatomaceous earth) of the second aspect of the present invention comprising grinding a feed inorganic particulate material (e.g. diatomaceous earth).

In accordance with a sixth aspect of the present invention, there is provided an article or product formed from a polymer composition in accordance with the first aspect of the present invention.

In certain embodiments of any aspect of the present invention, the polymer comprises a rubber. For example, the rubber may comprise a styrene butadiene rubber (SBR).

For example, the rubber may comprise, consist of, or essentially consist of an epoxidized natural rubber (ENR).

In certain embodiments of any aspect of the present invention, the inorganic particulate material is diatomaceous earth.

In certain embodiments of any aspect of the present invention, the inorganic particulate material (e.g. diatomaceous earth) has a surface area equal to or greater than about 40 $m^2g^{-1}$.

In certain embodiments of any aspect of the present invention, the inorganic particulate material (e.g. diatomaceous earth) has a surface area up to and including about 60 $m^2g^{-1}$. In certain embodiments, the inorganic particulate material (e.g. diatomaceous earth) has a surface area up to and including about 50 $m^2g^{-1}$.

In certain embodiments of any aspect of the present invention, at least about 90 vol % of the particles of inorganic particulate material (e.g. diatomaceous earth) are smaller than about 5 μm. For example, at least about 95 vol % of particles of inorganic particulate material (e.g. diatomaceous earth) may be smaller than about 5 μm.

In certain embodiments of any aspect of the present invention, at least about 50 vol % of the particles of inorganic particulate material (e.g. diatomaceous earth) are smaller than about 2 µm. For example, at least about 70 vol % of particles of inorganic particulate material (e.g. diatomaceous earth) may be smaller than about 2 µm.

In certain embodiments of any aspect of the present invention, at least about 20 vol % of the particles of inorganic particulate material (e.g. diatomaceous earth) are smaller than about 1 µm. For example, at least about 35 vol % of the particles of inorganic particulate material (e.g. diatomaceous earth) may be smaller than about 1 µm.

In certain embodiments of any aspect of the present invention, at least about 5 vol % of the particles of inorganic particulate material (e.g. diatomaceous earth) are smaller than about 0.5 µm. For example, at least about 10 vol % of the particles of inorganic particulate material (e.g. diatomaceous earth) may be smaller than about 0.5 µm.

In certain embodiments of any aspect of the present invention, the inorganic particulate material (e.g. diatomaceous earth) has a $d_{10}$ of less than about 1.0 µm. For example, the inorganic particulate material (e.g. diatomaceous earth) may have a $d_{10}$ of less than about 0.5 µm.

In certain embodiments of any aspect of the present invention, the inorganic particulate material (e.g. diatomaceous earth) has a $d_{50}$ of less than about 5.0 µm. For example, the inorganic particulate material (e.g. diatomaceous earth) may have a $d_{50}$ of less than about 3.0 µm.

In certain embodiments of any aspect of the present invention, the inorganic particulate material (e.g. diatomaceous earth) has a $d_{90}$ of less than about 8.0 µm. For example, the inorganic particulate material (e.g. diatomaceous earth) may have a $d_{90}$ of less than about 4.0 µm.

In certain embodiments of any aspect of the present invention, the inorganic particulate material (e.g. diatomaceous earth) is present in the composition in an amount ranging from about 50 phr to about 200 phr.

In certain embodiments of any aspect of the present invention, a composition comprising a polymer and inorganic particulate material (e.g. diatomaceous earth) has a tensile strength which is at least about 10% greater than the tensile strength of a corresponding composition in which the inorganic particulate material (e.g. diatomaceous earth) does not have a surface area equal to or greater than about 30 $m^2g^{-1}$. For example, the composition comprising a polymer and inorganic particulate material (e.g. diatomaceous earth) may have a tensile strength which is at least about 20% greater than the tensile strength of a corresponding composition in which the inorganic particulate material (e.g. diatomaceous earth) does not have a surface area equal to or greater than about 30 $m^2g^{-1}$.

In certain embodiments of any aspect of the present invention, a composition comprising a polymer and inorganic particulate material (e.g. diatomaceous earth) has a elongation at break which is at least about 5% greater than the elongation at break of a corresponding composition in which the inorganic particulate material (e.g. diatomaceous earth) does not have a surface area equal to or greater than about 30 $m^2g^{-1}$.

In certain embodiments of any aspect of the present invention, a composition comprising a polymer and inorganic particulate material (e.g. diatomaceous earth) has a tear strength which is at least about 10% greater than the tear strength of a corresponding composition in which the inorganic particulate material (e.g. diatomaceous earth) does not have a surface area equal to or greater than about 30 $m^2g^{-1}$. For example, the composition comprising a polymer and inorganic particulate material (e.g. diatomaceous earth) may have a tear strength which is at least about 20% greater than the tear strength of a corresponding composition in which the inorganic particulate material (e.g. diatomaceous earth) does not have a surface area equal to or greater than about 30 $m^2g^{-1}$.

In certain embodiments of any aspect of the present invention, a composition comprising a polymer and inorganic particulate material (e.g. diatomaceous earth) has an abrasion resistance which is at least about 5% greater than the abrasion resistance of a corresponding composition in which the inorganic particulate material (e.g. diatomaceous earth) does not have a surface area equal to or greater than about 30 $m^2g^{-1}$. For example, a composition comprising a polymer and inorganic particulate material (e.g. diatomaceous earth) may have an abrasion resistance which is at least about 10% greater than the abrasion resistance of a corresponding composition in which the inorganic particulate material (e.g. diatomaceous earth) does not have a surface area equal to or greater than about 30 $m^2g^{-1}$.

In certain embodiments of any aspect of the present invention, a composition comprising rubber and inorganic particulate material (e.g. diatomaceous earth) has a tensile strength of greater than about 12 MPa.

In certain embodiments of any aspect of the present invention, a composition comprising rubber and inorganic particulate material (e.g. diatomaceous earth) has an elongation at break of greater than about 815%.

In certain embodiments of any aspect of the present invention, a composition comprising rubber and inorganic particulate material (e.g. diatomaceous earth) has a tear strength of greater than about 30 N/mm.

In certain embodiments of any aspect of the present invention, a composition comprising rubber and inorganic particulate material (e.g. diatomaceous earth) has an abrasion resistance of greater than about 32 $mm^3$ volume loss.

In certain embodiments of any aspects of the present invention, the inorganic particulate material (e.g. diatomaceous earth) assists in improving one or more of tensile strength, elongation at break, tear strength and abrasion resistance of the polymer composition.

In certain embodiments of any aspect of the present invention, the composition comprising a polymer is used as a sealant, or is suitable for or intended for use as a sealant.

In certain embodiments of any aspect of the present invention, the inorganic particulate material (e.g. diatomaceous earth) is obtained by grinding a feed composition comprising inorganic particulate material (e.g. diatomaceous earth).

In certain embodiments of any aspect of the present invention, the inorganic particulate material (e.g. diatomaceous earth) is obtained by grinding a feed composition comprising inorganic particulate material (e.g. diatomaceous earth) and the work input is up to about 450 kwh/t (kilowatt hour per tonne (1000 kg)).

In a further aspect of the present invention, there is provided an inorganic particulate material (e.g. diatomaceous earth) obtained by or obtainable by grinding a feed composition. The inorganic particulate material (e.g. diatomaceous earth) obtained by or obtainable by grinding a feed composition may have one or more of the surface area and particle size distribution properties disclosed herein.

The details, examples and preferences provided in relation to any particular one or more of the stated aspects of the present invention apply equally to all aspects of the present invention. Any combination of the embodiments, examples and preferences described herein in all possible variations thereof is encompassed by the present invention unless otherwise indicated herein, or otherwise clearly contradicted by context.

DETAILED DESCRIPTION OF THE INVENTION

There is provided herein inorganic particulate material such as diatomaceous earth having a surface area equal to or greater than about 30 $m^2g^{-1}$, and compositions comprising this inorganic particulate material (e.g. diatomaceous earth). It has surprisingly been found that polymer compositions (e.g. rubber compositions) comprising inorganic particulate material (e.g. diatomaceous earth) having a surface area equal to or greater than about 30 $m^2g^{-1}$ demonstrate advantageous mechanical properties, for example improved tensile strength, elongation at break, tear strength and/or abrasion resistance.

Thus, in certain embodiments of the present invention, inorganic particulate material (e.g. diatomaceous earth) having a surface area equal to or greater than about 30 $m^2g^{-1}$ may be used as a filler in compositions comprising a polymer (e.g. rubber), to replace other fillers such as silica, with no or minimal reduction in mechanical properties such as tensile strength, elongation at break, tear strength and abrasion resistance. In certain embodiments, inorganic particulate material (e.g. diatomaceous earth) having a surface area equal to or greater than about 30 $m^2g^{-1}$ may be used as a filler in compositions, for example compositions comprising rubber, to replace other fillers, for example silica, and to improve the mechanical properties of the composition.

Diatomaceous earth naturally has a relatively high surface area, for example due to its porous structure. It may be thought that breaking down this porous structure by processes such as grinding may reduce the surface area of the material. However, in certain embodiments of the present invention, it has surprisingly been found that diatomaceous earth having a surface area equal to or greater than about 30 $m^2g^{-1}$ may be obtained by grinding of a feed diatomaceous earth (for example, a diatomaceous earth which may have undergone no processing, for example no grinding).

Inorganic Particulate Materials and Polymer Compositions Comprising a Polymer and Said Inorganic Particulate Materials There is provided herein an inorganic particulate material such as diatomaceous earth. There is also provided herein a polymer composition comprising, consisting essentially of, or consisting of a polymer and inorganic particulate material (e.g. diatomaceous earth). The embodiments described herein and all combinations thereof are equally applicable to all aspects of the present invention.

The inorganic particulate material (e.g. diatomaceous earth) may be present in a polymer composition in an amount ranging from about 50 phr to about 200 phr (parts per hundred polymer/parts per hundred rubber). For example, the inorganic particulate material (e.g. diatomaceous earth) may be present in a polymer composition in an amount ranging from about 50 phr to about 150 phr, for example from about 50 phr to about 120 phr, for example from about 50 phr to about 100 phr.

The polymer composition (e.g. rubber composition) may have a tensile strength which is at least about 10% greater than the tensile strength of a corresponding composition in which the inorganic particulate material (e.g. diatomaceous earth) does not have a surface area equal to or greater than about 30 $m^2g^{-1}$. For example, the polymer composition (e.g. rubber composition) may have a tensile strength which is at least about 15% greater, for example at least about 20% greater than the tensile strength of a corresponding composition in which the inorganic particulate material (e.g. diatomaceous earth) does not have a surface area equal to or greater than about 30 $m^2g^{-1}$. For example, the polymer composition (e.g. rubber composition) may have a tensile strength which is at least about 25% greater, for example at least about 30% greater than the tensile strength of a corresponding composition in which the inorganic particulate material (e.g. diatomaceous earth) does not have a surface area equal to or greater than about 30 $m^2g^{-1}$.

For example, the polymer composition may comprise rubber and may have a tensile strength of greater than or equal to about 12 MPa. For example, the polymer composition may comprise rubber and may have a tensile strength of greater than or equal to about 13 MPa, for example greater than or equal to about 14 MPa, for example greater than or equal to about 15 MPa. The polymer composition may, for example, comprise rubber and have a tensile strength up to about 30 MPa, for example up to about 25 MPa, for example up to about 20 MPa.

Unless otherwise stated, tensile strength of a polymer composition is measured using test pieces of the type described as "die C" in ASTM D412.

The polymer composition (e.g. rubber composition) may have an elongation at break which is at least about 5% greater than the elongation at break of a corresponding composition in which the inorganic particulate material (e.g. diatomaceous earth) does not have a surface area equal to or greater than about 30 $m^2g^{-1}$. For example, the polymer composition (e.g. rubber composition) may have an elongation at break which is at least about 6% greater, for example at least about 7% greater, for example at least about 10% greater than the elongation at break of a corresponding composition in which the inorganic particulate material (e.g. diatomaceous earth) does not have a surface area equal to or greater than about 30 $m^2g^{-1}$.

For example, the polymer composition may comprise rubber and may have an elongation at break which is equal to or greater than about 815%. For example, the polymer composition may comprise rubber and may have an elongation at break which is equal to or greater than about 820%, for example equal to or greater than about 825%. For example, the polymer composition may comprise rubber and may have an elongation at break which is equal to or greater than about 826%, for example equal to or greater than about 830%. The polymer composition may, for example, comprise rubber and have an elongation at break up to about 900%, for example up to about 870%, for example up to about 850%.

Unless otherwise stated, elongation at break of a polymer composition is measured using test pieces of the type described as "die C" in ASTM D412.

The polymer composition (e.g. rubber composition) may have a tear strength which is at least about 5% greater than the tear strength of a corresponding composition in which the inorganic particulate material (e.g. diatomaceous earth) does not have a surface area equal to or greater than about 30 $m^2g^{-1}$. For example, the polymer composition (e.g. rubber composition) may have a tear strength which is at least about 10% greater, for example at least about 15% greater, for example at least about 20% greater than the tear strength of a corresponding composition in which the inorganic particulate material (e.g. diatomaceous earth) does not have a surface area equal to or greater than about 30 $m^2g^{-1}$. For example, the polymer composition (e.g. rubber composition) may have a tear strength that is at least about 22% greater, for example at least about 24% greater, for example at least about 25% greater than the tear strength of a corresponding composition in which the inorganic particulate material (e.g. diatomaceous earth) does not have a surface area equal to or greater than about 30 $m^2g^{-1}$.

For example, the polymer composition may comprise rubber and may have a tear strength which is equal to or greater than about 30 N/mm. For example, the polymer composition may comprise rubber and may have a tear strength which is equal to or greater than about 31, for example equal to or greater than about 32 N/mm, for example equal to or greater than about 33 N/mm, for example equal to greater than about 34 N/mm. For example, the polymer composition may comprise rubber and may have a tear strength which is equal to or greater than about 35 N/mm. The polymer composition may, for example, comprise rubber and have a tear strength up to about 50 N/mm, for example up to about 45 N/mm, for example up to about 40 N/mm, for example up to about 35 N/mm, for example up to about 30 N/mm.

Unless otherwise stated, tear strength of a polymer composition is measured using test pieces described as "die B" in ASTM D624 pre-cut with a 0.5 mm razor nick.

The polymer composition (e.g. rubber composition) may have an abrasion resistance which is at least about 5% greater than the abrasion resistance of a corresponding composition in which the inorganic particulate material (e.g. diatomaceous earth) does not have a surface area equal to or greater than about 30 $m^2g^{-1}$. For example, the polymer composition (e.g. rubber composition) may have an abrasion resistance which is at least about 10% greater, for example at least about 12% greater, for example at least about 14% greater, for example at least about 15% greater than the abrasion resistance of a corresponding composition in which the inorganic particulate material (e.g. diatomaceous earth) does not have a surface area equal to or greater than about 30 $m^2g^{-1}$.

For example, the polymer composition may comprise rubber and may have an abrasion resistance of equal to or less than about 350 $mm^3$ volume loss. For example, the polymer composition may comprise rubber and may have an abrasion resistance of equal to or less than about 340 $mm^3$ volume loss, for example equal to or less than about 330 $mm^3$ volume loss. The polymer composition may, for example comprise rubber and have an abrasion resistance between about 0 and about 350 $mm^3$ volume loss, for example between about 50 and about 350 $mm^3$ volume loss, for example about 100 and about 350 $mm^3$ volume loss.

Unless otherwise stated, abrasion resistance of a polymer composition is determined by measuring volume loss of the polymer composition using a SATRA model STM602 abrasion tester in accordance with the DIN abrasion test ISO 4649. The abrader described in ISO 4649 is known in the rubber industry as the DIN abrader.

The "corresponding composition in which the inorganic particulate material (e.g. diatomaceous earth) does not have a surface area equal to or greater than about 30 $m^2g^{-1}$", may be substantially identical, for example identical, to the composition to which it is being compared except that the inorganic particulate material (e.g. diatomaceous earth) does not have a surface equal to or greater than about 30 $m^2g^{-1}$. For example, the corresponding composition may comprise the same polymer and may comprise the same inorganic particulate material (e.g. diatomaceous earth) in the same wt % as the composition to which it is being compared. Where the polymer composition of the invention has a surface area greater than about 30 $m^2g^{-1}$, the corresponding composition may not have a surface area greater than about 30 $m^2g^{-1}$, for example, where the polymer composition of the invention has a surface area equal to or greater than about 40 $m^2g^{-1}$, the corresponding composition may not have a surface area equal to or greater than about 40 $m^2g^{-1}$ etc.

Polymer

The polymer may suitably be any polymer which may benefit from the advantageous properties provided by the inorganic particulate material (e.g. diatomaceous earth). For example, the polymer may be any polymer which may benefit from improved tensile strength, elongation at break, tear strength and/or abrasion resistance.

For example, the polymer may comprise any thermoplastic or thermoset material. Thermoplastic materials are those which soften under the action of heat and harden again to their original characteristics on cooling, that is, the heating-cooling cycle is fully reversible. By conventional definition, thermoplastics are straight and branched linear chain organic polymers with a molecular bond. Examples of well-known thermoplastics include products of acrylonitrile butadiene styrene (ABS), styrene acrylonitrile (SAN), acrylate styrene acrylonitrile (ASA), methacrylate butadiene styrene (MBS). Also included are polymers of formaldehyde, known as acetals; polymers of methyl methacrylate, known as acrylic plastics; polymers of monomeric styrene, known as polystyrenes; polymers of fluorinated monomers, known as fluorocarbons; polymers of amide chains, known as nylons; polymers of paraffins and olefins, known as poly ethylenes, polypropylenes, and polyolefins; polymers composed of repeating bisphenoi and carbonate groups, known as polycarbonates; polymers of terephthalates, known as polyesters; polymers of bisphenol and dicarboxylic acids, known as polyarylates; polymers of vinyl chlorides, known as polyvinyl chlorides (PVC) and high performance thermoplastics such as polyphenylene sulfide (PPS), polyether ketone (PEK), polyether ether ketone (PEEK), polyamide imide (PAI), and polyetherimide (PEI). Unusual thermoplastics include ionomers, i.e., copolymers of ethylene and methacrylic acid that have ionic rather than covalent crosslinking which results in behavior resembling that of thermoset plastics in their operating range; polyvinylcarbazole, which has unique electrical properties; and polymers of isobutylene, known as polyisobutylenes, which are viscous at room temperature.

Thermoset materials are synthetic resins that are permanently changed upon thermal curing, that is, they solidify into an infusible state so that they do not soften and become plastic again upon subsequent heating. However, certain thermoset plastics may exhibit thermoplastic behaviour over a limited portion of their useful application ranges. Some types of thermoset plastics, especially certain polyesters and epoxides, are capable of cold curing at room temperature. Thermoset plastics include polyesters, alkyds, phenolics, epoxides, aminos (including urea-formaldehyde and melamine-formaldehyde), polyimides, and some silicon plastics.

In certain embodiments, the polymer composition may comprise rubber. The term rubber may refer to natural rubber, which principally comprises polymers of isoprene and is mainly harvested in the form of latex from certain trees, or may be synthetic rubber, which is any type of elastomeric polymer produced by the polymerization of monomers, for example petroleum byproducts. The rubber may, for example, be a modified natural rubber. The rubber may be a mixture of natural and synthetic rubbers.

Examples of rubbers include, but are not limited to, polyacrylate rubber (ACM), ethylene-acrylate rubber (AEM), polyester urethane (AU), bromo isobutylene isoprene (BIIR), polybutadiene (BR), chloro isobutylene isoprene (CSM), epichlorohydrin (ECO), epoxidized natural rubber (ENR), ethylene propylene (EP), ethylene propylene diene monomer (EPDM), polyether urethane (EU), perfluorcarbon rubber (FFKM), fluorinated hydrocarbon (FKM), fluoro silicone (FMQ), fluorocarbon rubber (FPM), hydrogenated nitrile butadiene (HNBR), polyisoprene (IR), isobutylene isoprene butyl (IIR), acrylonitrile butadiene (NBR), polyurethane (PU), styrene butadiene (SBR), styrene ethylene butylenes styrene copolymer (SEBS), polysiloxane (SI), vinyl methyl silicaone (VMQ), acrylonitrile butadiene carboxy monomer (XNBR), styrene butadiene carboxy monomer (XSBR), thermoplastic polyether-ester (YBPO), styrene butadiene block copolymer (YSBR) and styrene butadiene carboxy block copolymer (YXSBR). In certain embodiments, the rubber comprises a styrene butadiene rubber. In certain embodiments, the rubber comprises an epoxidized natural rubber such as, for example, a natural rubber which has epoxide groups randomly dispersed along the polymer backbone. For example, the epoxidized natural rubber may be natural rubber latex 1,4-polyisoprene (e.g. cis 1,4-polyisoprene) with between about 20 mol % and 60 mol % epoxidization of the alkene groups. The epoxidized natural rubber may have about 25 mol % epoxidization or about 50 mol % epoxidization. Suitable commercially available examples of ENR include, for example, Ekoprena ENR-25™ or Ekoprena ENR-50™, which are available from MARDEC BERHAD, Malaysia (http://www.mardec.com.my/index.html).

Inorganic Particulate Material

The inorganic particulate material may be selected from one or more of the following: alkaline earth metal carbonate (for example dolomite, i.e. $CaMg(CO_3)_2$), metal sulphate (for example gypsum), metal silicate, metal oxide (for example iron oxide, chromia, antimony trioxide or silica), metal hydroxide, wollastonite, bauxite, talc (for example, French chalk), mica, zinc oxide (for example, zinc white or Chinese white), titanium dioxide (for example, anatase or rutile), zinc sulphide, calcium carbonate (for example precipitated calcium carbonate (PCC), ground calcium carbonate (GCC) or surface-modified calcium carbonate), barium sulphate (for example, barite, blanc fixe or process white), alumina hydrate (for example, alumina trihydrate, light alumina hydrate, lake white or transparent white), clay (for example kaolin, calcined kaolin, China clay or bentonite), diatomaceous earth (diatomite or DE), perlite and combinations thereof. The inorganic particulate material may be selected from any one or more of the materials listed. The inorganic particulate material may comprise a blend of any combination of the listed materials. The inorganic particulate material may be diatomaceous earth. Hereinafter, embodiments of the present invention may tend to be discussed in terms of diatomaceous earth. However, the invention should not be construed as being limited to such embodiments.

The diatomaceous earth material is typically obtained from a natural diatomaceous earth, which may be obtained from a saltwater source or from a freshwater source. The diatomaceous earth may be diatomaceous earth in its crude form or after subjecting the material to one or more processing steps.

Diatomaceous earth is, in general, a sedimentary biogenic silica deposit comprising the fossilized skeletons of diatoms, one-celled algae-like plants that accumulate in marine or fresh water environments. Honeycomb silica structures generally give diatomaceous earth useful characteristics such as absorptive capacity and surface area, chemical stability, and low-bulk density. The diatomaceous earth may comprise about 90% $SiO_2$ mixed with other substances. Crude diatomaceous earth may comprise about 90% $SiO_2$, plus various metal oxides, such as but not limited to Al, Fe, Ca, and Mg oxides. The diatomaceous earth may have any of the various appropriate forms now known to the skilled artisan or hereafter discovered.

The diatomaceous earth may be a commercially available diatomaceous earth product. For example, the diatomaceous earth may be a material available under the Celite® trade name available from Imerys Filtration Minerals.

The inorganic particulate material (e.g. diatomaceous earth) may be unprocessed (e.g., not subjected to chemical and/or physical modification processes). The inorganic particulate material (e.g. diatomaceous earth) may, for example, comprise mineral impurities. The impurities may, for example be present in an amount less than about 5%, for example less than about 4%, 3%, 2% or 1%, by weight of the inorganic particulate material. For example, the impurities may be present in an amount of less than about 0.5% by weight of the inorganic particulate material. Without wishing to be bound by theory, the impurities in natural diatomaceous earth, such as clays and organic matters, may, in some embodiments, provide higher cation exchange capacity.

The inorganic particulate material (e.g. diatomaceous earth) may undergo processing following mining or extraction. For example, the natural inorganic particulate material (e.g. diatomaceous earth) may be subjected to at least one physical modification process. The skilled artisan will readily know appropriate physical modification processes, which may be now known or hereafter discovered. Appropriate physical modification processes may include, but are not limited to, milling, drying, and air classifying. The at least one natural inorganic particulate material (e.g. diatomaceous earth) may, for example, be subjected to at least one chemical modification process. The skilled artisan will readily know appropriate chemical modification processes, which may be now known or hereafter discovered. Appropriate chemical modification processes may include, but are not limited to, silanization. Silanization may be used to render the surfaces of the at least one natural inorganic particulate material (e.g. diatomaceous earth) either more hydrophobic or hydrophilic using the methods appropriate for silicate minerals. See U.S. Pat. No. 3,915,735 and U.S. Pat. No. 4,260,498, the contents of which are incorporated herein by reference in their entireties. For example, in order to increase hydrophobicity, the at least one natural inorganic particulate material (e.g. diatomaceous earth) may be placed in a plastic vessel, and a small quantity of dimethyldichlorosilane ($SiCl_2(CH_3)_2$) or hexadimethylsilazane (($CH_3)_3$Si—NH—Si($CH_3)_3$) may be added to the vessel. The reaction is allowed to take place at the inorganic particulate material (e.g. diatomaceous earth) surface in the vapor phase over a 24-hour period.

An inorganic particulate starting material (e.g. a diatomaceous earth starting material) may, for example, undergo grinding in order to obtain an inorganic particulate material (e.g. diatomaceous earth) in accordance with the present invention, having the desired surface area. The inorganic particulate starting material (e.g. diatomaceous earth starting material) (i.e. before grinding) may be characterized by a $d_{10}$ value, defined as the size at which 10 percent of the inorganic particle volume (e.g. diatomite particle volume) is accounted for by particles having a diameter less than the stated value. For example, the inorganic particulate starting material (e.g. diatomaceous earth starting material) may have $d_{10}$ less than about 6 µm, for example, the $d_{10}$ may be less than about 5 µm. For example, the $d_{10}$ of the inorganic particulate starting material (e.g. diatomaceous earth starting material) may be from about 1 to about 5 µm, for example from about 1 to about 5 µm. The inorganic particulate starting material (e.g. diatomaceous earth starting material) may be characterized by a $d_{50}$ value, defined as the size at which 50 percent of the particle volume is accounted for by particles having a diameter less than the stated value. The inorganic particulate starting material (e.g. diatomaceous earth starting material) may, for example, have a $d_{50}$ less than about 20 µm, for example, the $d_{50}$ may be less than about 15 µm or less than about 12 µm. The $d_{50}$ of the inorganic particulate starting material (e.g. diatomaceous earth starting material) may, for example, be from about 5 to about 20, for example from about 10 to about 15 µm. The inorganic particulate starting material (e.g. diatomaceous earth starting material) may be characterized by a $d_{90}$ value, defined as the size at which 90 percent of the particle volume is accounted for by particles having a diameter less than the stated value. For example, the inorganic particulate starting material (e.g. diatomaceous earth starting material) may have a $d_{90}$ less than about 40 µm. For example, the $d_{90}$ may be less than about 30 µm. For example, the $d_{90}$ may be from about 15 to about 30 µm, for example from about 15 to about 25 µm.

Particle size measurements, such as those for $d_{10}$, $d_{50}$, and $d_{90}$ determinations, are carried out using standard techniques on a CILAS model 1064LD laser diffraction instrument using the Fraunhofer approximation model. In this technique, the size of particles in powders, suspensions and emulsions may be measured using the diffraction of a laser beam, based on application of the Fraunhofer theory. Results may be reported as cumulative percentage by volume as a function of the measured particle diameter. The term "mean particle size" or "$d_{50}$" used herein is the value, determined in this way, of the particle diameter at which there are 50% by volume of the particles which have a diameter less than the $d_{50}$ value. The preferred sample formulation for measurement of particle sizes using the CILAS 1064LD instrument is a suspension in a liquid.

Inorganic particulate material (e.g. diatomaceous earth) in accordance with the various aspects of present invention has a surface area equal to or greater than about 30 $m^2g^{-1}$. For example, the inorganic particulate material (e.g. diatomaceous earth) may have a surface area equal to or greater than about 32 $m^2g^{-1}$, for example equal to or greater than about 35 $m^2g^{-1}$, for example equal to or greater than about 37 $m^2g^{-1}$. For example, the inorganic particulate material (e.g. diatomaceous earth) may have a surface area equal to or greater than about 40 $m^2g^{-1}$, for example equal to or greater than about 41 $m^2g^{-1}$, for example equal to or greater than about 42 $m^2g^{-1}$. For example, the inorganic particulate material (e.g. diatomaceous earth) may have a surface area equal to or greater than about 45 $m^2g^{-1}$, for example equal to or greater than about 47 $m^2g^{-1}$. The inorganic particulate material (e.g. diatomaceous earth) may, for example, have a surface area equal to or greater than about 50 $m^2g^{-1}$.

The inorganic particulate material (e.g. diatomaceous earth) may, for example, have a surface area up to and including about 60 $m^2g^{-1}$. For example, the inorganic particulate material (e.g. diatomaceous earth) may have a surface area up to and including about 55 $m^2g^{-1}$, for example up to and including about 50 $m^2g^{-1}$. For example, the inorganic particulate material (e.g. diatomaceous earth) may have a surface area up to and including about 40 $m^2g^{-1}$.

The inorganic particulate material (e.g. diatomaceous earth) may, for example, have a surface area ranging from about 30 $m^2g^{-1}$ to about 60 $m^2g^{-1}$. For example, the inorganic particulate material (e.g. diatomaceous earth) may have a surface area ranging from about 32 $m^2g^{-1}$ to about 60 $m^2g^{-1}$ or from about 35 $m^2g^{-1}$ to about 60 $m^2g^{-1}$. For example, the inorganic particulate material (e.g. diatomaceous earth) may have a surface area ranging from about 40 $m^2g^{-1}$ to about 60 $m^2g^{-1}$ or from about 50 $m^2g^{-1}$ to about 60 $m^2g^{-1}$. The inorganic particulate material (e.g. diatomaceous earth) may, for example, have a surface area ranging from about 40 $m^2g^{-1}$ to about 55 $m^2g^{-1}$, for example from about 40 $m^2g^{-1}$ to about 50 $m^2g^{-1}$.

Unless otherwise stated, the surface area of the inorganic particulate material (e.g. diatomaceous earth) is determined by nitrogen adsorption (BET) method. The BET surface area may be determined by the method described in Brunauer et al., J. Am. Chem. Soc., 60, p 309, 1938, the contents of which are incorporated herein by reference.

In accordance with the various aspects of the present invention, at least about 90 vol % of particles of inorganic particulate material (e.g. diatomaceous earth) may be smaller than about 5 µm. For example, at least about 91 vol %, for example at least about 92 vol %, 93 vol % or 94 vol %, of the particles of inorganic particulate material (e.g. diatomaceous earth) may be smaller than about 5 µm. For example, at least about 95 vol %, for example at least about 96 vol %, 97 vol %, 98 vol % or 99 vol % of particles of inorganic particulate material (e.g. diatomaceous earth) may be smaller than about 5 µm. For example, 100 vol % of particles of inorganic particulate material (e.g. diatomaceous earth) may be smaller than about 5 µm. For example, up to about 99 vol % of particles of inorganic particulate material (e.g. diatomaceous earth) may be smaller than about 5 µm. For example, up to about 98 vol %, for example up to about 97 vol %, for example up to about 96 vol % of particles may be smaller than about 5 µm.

In accordance with the various aspects of the present invention, at least about 50 vol % of particles of inorganic particulate material (e.g. diatomaceous earth) may be smaller than about 2 µm. For example, at least about 60 vol %, for example at least about 70 vol %, of particles of inorganic particulate material (e.g. diatomaceous earth) may be smaller than about 2 µm. For example, at least about 75 vol %, for example at least about 80 vol %, for example at least about 85 vol %, of particles of inorganic particulate material (e.g. diatomaceous earth) may be smaller than about 2 µm. Up to about 99 vol % of particles of inorganic particulate material (e.g. diatomaceous earth) may be smaller than about 2 µm. For example, up to about 95 vol %, for example up to about 90 vol %, for example up to about 85 vol % of particles of inorganic particulate material (e.g. diatomaceous earth) may be smaller than about 2 µm.

In accordance with the various aspects of the present invention, at least about 20 vol % of particles of inorganic particulate material (e.g. diatomaceous earth) may be smaller than about 1 µm. For example, at least about 25 vol %, for example at least about 30 vol % of particles of inorganic particulate material (e.g. diatomaceous earth) may be smaller than about 1 µm. For example, at least about 35 vol % or at least about 40 vol % of particles of inorganic particulate material (e.g. diatomaceous earth) may be smaller than about 1 µm. For example, at least about 45 vol % or at least about 50 vol % of particles of inorganic particulate material (e.g. diatomaceous earth) may be smaller than about 1 µm. Up to about 90 vol % of particles may, for example, be smaller than about 1 µm. For example, up to about 80 vol %, for example up to about 70 vol %, for example up to about 60 vol % of particles of inorganic particulate material (e.g. diatomaceous earth) may be smaller than about 1 μm. For example, up to about 55 vol %, for example up to about 50 vol % of particles of inorganic particulate material (e.g. diatomaceous earth) may be smaller than about 1 μm.

In accordance with the various aspects of the present invention, at least about 5 vol % of particles of inorganic particulate material (e.g. diatomaceous earth) may be smaller than about 0.5 μm. For example, at least about 7 vol %, for example at least about 10 vol %, for example at least about 15 vol % of particles of inorganic particulate material (e.g. diatomaceous earth) may be smaller than about 0.5 μm. Up to about 50 vol % of particles of inorganic particulate material (e.g. diatomaceous earth) may, for example, be smaller than about 0.5 μm. For example, up to about 40 vol %, for example up to about 30 vol %, for example up to about 20 vol % of particles of inorganic particulate material (e.g. diatomaceous earth) may be smaller than about 0.5 μm.

In accordance with the various aspects of the present invention, the inorganic particulate material (e.g. diatomaceous earth) may have a $d_{10}$ of less than about 1.0 μm. For example, the inorganic particulate material (e.g. diatomaceous earth) may have a $d_{10}$ of less than about 0.9, 0.8, 0.7, 0.6 or 0.5 μm. For example, the inorganic particulate material (e.g. diatomaceous earth) may have a $d_{10}$ between about 0.1 and about 1.0 μm, for example between about 0.2 and about 0.5 μm.

In accordance with the various aspects of the present invention, the inorganic particulate material (e.g. diatomaceous earth) may have a $d_{50}$ of less than about 5.0 μm. For example, the inorganic particulate material (e.g. diatomaceous earth) may have a $d_{50}$ of less than about 4.0 μm, for example less than about 3.0 μm, for example less than about 2.0 μm. For example, the inorganic particulate material (e.g. diatomaceous earth) may have a $d_{50}$ between about 0.1 and about 5.0 μm, for example between about 0.5 and about 3.0 μm.

Other Additives

The polymer composition, for example the rubber composition, may comprise further optional additives, such as, for example, one or more curing aids or curing system (for example including a curative and an accelerant to aid vulcanization of the polymer), one or more cure system activator, one or more anti-degradant, one or more processing additives such as lubricants, oils, resins (including tackifying resins) and plasticizers, one or more other fillers, one or more pigments and/or one or more peptizing agents.

A rubber composition may further comprise one or more additional particulate filler, one or more coupling agent, one or more processing aids, for example one or more process oil, one or more antioxidant and/or anti-degradant, one or more lubricant (release aid), one or more curing systems (for example including a curative and an accelerant to aid vulcanization of the rubber) for the rubber and/or one or more activators for the curing system.

Where present, the additional filler component(s) may, for example, be selected from particulate silica, carbon black, or both. The silica may be a precipitated silica. The polymer in the composition may comprise rubber.

The particulate silica, when present, is typically in an amount of between about 40 and about 150 phr. The carbon black, when present without silica, is typically in an amount of between about 10 and about 80 phr. The carbon black, when present with silica, is in an amount between about 1 and about 45 phr. The additional particulate filler component(s) may suitably be present in the composition in a total amount between about 20 and about 170 phr.

It is preferred that the amount of any conventional additional particulate filler component(s) present is such that the inorganic particulate material (e.g. diatomaceous earth) can be considered as having substituted, on a 1:1 weight basis, from about 10% to about 80% by weight of the conventional amount of the additional particulate filler that would be employed for the desired composition. In the case of silica as the primary additional filler, it is preferred that the inorganic particulate material (e.g. diatomaceous earth) will substitute about 20% to about 80% by weight of the conventional amount of the silica in the composition. In the case of carbon black as the primary additional filler, it is preferred that the inorganic particulate material (e.g. diatomaceous earth) will substitute about 20% to about 80% by weight of the conventional amount of the carbon black in a carbon-filled tyre tread rubber composition.

For example, the inorganic particulate material (e.g. diatomaceous earth) may replace up to 60 parts by weight of silica based on 100 parts by weight of the polymer, for example from 5 parts to 50 parts by weight of silica based on 100 parts by weight of the polymer, for example from 5 parts to 30 parts by weight of silica based on 100 parts by weight of the polymer (phr). The partial substitution of an amount of silica in a rubber composition by an inorganic particulate material (e.g. by a diatomaceous earth), can unexpectedly preserve the reinforcement level of the composition and enhance key mechanical properties of the polymer composition, and of products incorporating the compositions. Furthermore, inorganic particulate material such as diatomaceous earth does not exhibit a dependency on a coupling agent to the degree exhibited by a silica filler, so that the substitution of some or all of the silica by the inorganic particulate material (e.g. diatomaceous earth) reduces the amount of the coupling agent required.

One or more coupling agent(s) may be present in the composition, in particular when silica is used as an additional filler. The coupling agent component (s), when present, may be selected from organosilane coupling agents.

Examples of suitable organosilane coupling agents include compounds of formula I:

wherein $R_1$ is an aminoalkyl or mercaptoalkyl group, $R_2$ is a hydroxy, hydroxyalkyl or alkoxy group, and each of $R_3$ and $R_4$, which may be the same or different, is a hydrogen atom or a hydroxy, alkyl, hydroxyalkyl or alkoxy group. Each of $R_2$, $R_3$ and $R_4$ may, for example, be a hydroxy, hydroxyalkyl or alkoxy group, and each of $R_1$, $R_2$, $R_3$ and $R_4$ may, for example, contain not more than 4 carbon atoms. In one example, $R_1$ may be a-mercaptopropyl group and each of $R_2$, $R_3$ and $R_4$ may be a methoxy group.

An alternative representation of examples of suitable organosilane coupling agents, which to some extent overlaps with formula I, is given by the following formula II:

wherein R' represents a $C_{1-4}$ alkyl (e.g. methyl or ethyl) group, $R_1$ represents a methyl or ethyl group and X represents a mercaptopropyl group, a vinyl group or a thiocyanatopropyl group.

Still further examples of suitable organosilane coupling agents include compounds of formula III:

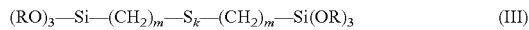  (III)

wherein R represents a $C_{1-4}$ alkyl (e.g. methyl or ethyl) group and m and k are each independently selected from the integers 1, 2, 3, 4, 5 and 6 (e.g. m=3 and k=4).

Still further examples of suitable organosilane coupling agents include compounds of formula IV:

  (IV)

wherein X represents a $C_{1-4}$ alkoxy (e.g. methoxy or ethoxy) group or a chlorine atom, and R represents a glycidoxy, methacryl, amino, mercapto, epoxy or imide group.

The organosilane coupling agent may be bis-(3-triethoxysilylpropyl)-tetrasulphide, i.e. a compound of formula III in which R is ethyl, m=3 and k=4. An alternative organosilane coupling agent is y-mercaptopropyl trimethoxy silane.

The organosilane coupling agent component(s) may suitably be present in the composition in an amount up to about 20% by weight of the total amount of inorganic particulate material (e.g. diatomaceous earth) and any additional filler, preferably between about 1 and about 15% by weight.

The organosilane coupling agent component(s) may be added directly into the composition mixture during blending (compounding) of the composition, or at least a portion of the organosilane coupling agent component(s) may be used to pre-treat the inorganic particulate material (e.g. particulate diatomaceous earth) filler and/or some or all of any additional particulate filler component(s) prior to addition of the filler component(s) to the composition mixture, the organosilane adhering to the filler particles. Preferably, the organosilane will be present in an amount up to about 20% by weight of the inorganic particulate material (e.g. diatomaceous earth) particles, more preferably from about 1% to about 15% by weight.

One or more process oils may be present in the composition. The process oil component(s), when present, may be selected from one or more dewaxed highly refined rubber process oils. Such oils may be predominantly aromatic, or may have a predominance of saturated rings and long paraffinic side chains. The aromatic oils typically have a low aniline point, e.g. below about 25° C. The paraffinic oils typically have a high aniline point, e.g. above about 95° C.

The aromatic process oil component (s) may typically have a density (15° C.) of about 1.01 g/cm³, a viscosity (40° C.) of about 840 cSt, a viscosity (100° C.) of about 21 cSt, a flash-point (OCC) of about 245° C. and a pour point of about 6° C.

The paraffinic process oil component(s) may typically have a density (15° C.) of about 0.9 g/cm³, a viscosity (40° C.) of about 475 cSt, a viscosity (100° C.) of about 31 cSt, a flash-point (COC) of about 305° C. and a pour point of about −9° C.

The process oil component(s) may suitably be present in the composition in an amount between about 1 and about 10 phr, for example between about 2 and about 8 phr.

One or more antioxidant and/or anti-degradant may be present in the composition. The antioxidant and/or anti-degradant component(s), when present, may be selected from one or more aromatic organic radical- and/or ozone-scavenging compounds, such as polymerised quinoline derivatives, PPD (paraphenylenediamine) derivatives and diphenylamine derivatives. The antioxidant/anti-degradant may be a PPD antiozonant such as N-isopropyl-N'-phenyl-p-phenylenediamine or N-(1,3-dimethylbutyl)-N'-phenyl-p-phenylenediamine or a mixture of diaryl-p-phenylenediamines or a polymerised quinoline derivative such as 2,2, 4-trimethyl-1,2dihydroquinoline.

The antioxidant/anti-degradant component(s) may suitably be present in the composition in an amount between about 0.5 and about 4 phr, for example between about 1 and about 3 phr.

One or more lubricant(s) may be present in the composition. The lubricant component(s), when present, may be selected from one or more lubricant wax, e.g. a paraffin wax, a micro-crystalline wax, or both.

The lubricant component (s) may suitably be present in the composition in an amount between about 0.5 and about 4 phr, preferably between about 1 and about 3 phr.

Any suitable curing system for the polymer may be employed in the present invention. Curing of a rubber composition normally involves vulcanisation, and is effected by subjecting the uncured rubber composition to conditions of heat and pressure (see below). The vulcanisation may be achieved by means of a vulcanising agent. Examples of suitable vulcanising agents include elemental (free) sulphur or sulphur donors such as amine disulphides, polymeric polysulphides or sulphur-olefin adducts. The vulcanising agent may be elemental sulphur or a combination of elemental sulphur and one or more sulphur donor.

The vulcanising agent component(s) may suitably be present in the rubber composition in an amount between about 0.5 and about 5 phr, for example between about 0.5 and about 2 phr.

An accelerator may be used with a vulcanising agent to control the time required for vulcanisation and to improve the properties of the vulcanisate. A single ("primary") or multiple ("primary" and "secondary") accelerator system may be used, as will be known to one of ordinary skill in this art. The or each accelerator may suitably be present in an amount between about 0.5 and about 5 phr, for example between about 0.5 and about 4 phr. Suitable accelerators may include amines, disulphides, guanidines, thioureas, thiazoles, thiurams, sulphenamides, dithiocarbamates and xanthates. Particular examples of these materials are TBzTD (tetrabenzyl thiuram disulphide), CBS (N-cyclohexyl benzothiazole sulphenamide), TBBS (N-tert. butyl-2-benzothiazole sulphenamide) and DPG (diphenyl guanidine).

One or more activator component(s) for the accelerator may be present in the composition. The activator component(s), when present, may be selected from one or more saturated fatty acid such as stearic acid, palmitic acid, or both, or zinc oxide. Fatty acids may also serve as dispersing agents for the fillers. The activator component(s) may suitably be present in the composition in an amount between about 3 and about 12 phr, for example between about 5 and about 10 phr.

Use of Inorganic Particulate Material (e.g. Diatomaceous Earth) as a Filler in a Polymer Composition There is provided herein a use of inorganic particulate material (e.g. diatomaceous earth) having a surface area equal to or greater than about 30 $m^2g^{-1}$ as a filler in a composition comprising a polymer.

The composition comprising a polymer and inorganic particulate material (e.g. diatomaceous earth) and/or the inorganic particulate material (e.g. diatomaceous earth) disclosed herein include not only the first and second aspects of the present invention, but also any of the embodiments disclosed herein, including any combination of these embodiments in all possible variations thereof.

The inorganic particulate material (e.g. diatomaceous earth) may be used as a filler in a composition comprising a polymer to at least assist in improving one or more properties of the polymer composition selected from the group consisting of tensile strength, elongation at break, tear strength and abrasion resistance. For example, inorganic particulate material (e.g. diatomaceous earth) may be used as a filler in a composition comprising a rubber to at least assist in improving one or more properties of the rubber composition selected from the group consisting of tensile strength, elongation at break, tear strength and abrasion resistance.

The inorganic particulate material (e.g. diatomaceous earth) may be used as a filler in a composition comprising a polymer (e.g. rubber) in order to replace or reduce the amount of one or more other fillers in the composition. For example, inorganic particulate material (e.g. diatomaceous earth) may be used as a filler in a composition comprising a polymer (e.g. rubber) in order to replace or reduce the amount of silica, for example precipitated silica.

For example, the inorganic particulate material (e.g. diatomaceous earth) may be used as a filler in a composition comprising a polymer (e.g. rubber) in order to replace or reduce the amount of one or more other fillers in the composition without deteriorating one or more properties of the composition selected from the group consisting of tensile strength, elongation at break, tear strength and abrasion resistance. For example, inorganic particulate material (e.g. diatomaceous earth) may be used as a filler in a composition comprising a polymer (e.g. rubber) in order to replace or reduce the amount of silica in the composition without deteriorating one or more properties of the composition selected from the group consisting of tensile strength, elongation at break, tear strength and abrasion resistance.

The inorganic particulate material (e.g. diatomaceous earth) may be used as a filler in a composition comprising a polymer and the resultant composition may be used as a sealant.

The inorganic particulate material (e.g. diatomaceous earth) may be used as a filler in a composition comprising a polymer and the resultant polymer compositions may be used in/for cements, adhesives, insulation, friction tapes, vehicle tyres, gaskets, belting, engine mounts, vibration-dampening mounts and piping.

For example, the inorganic particulate material (e.g. diatomaceous earth) may be used as a filler in a composition comprising a polymer (e.g. rubber) and the resultant polymer compositions (e.g. rubber compositions) may be used in/for vehicle tyres, for example for the side-walls of vehicle tyres and/or for the tyre tread.

For example, the inorganic particulate material (e.g. diatomaceous earth) may be used as a filler in a composition comprising a polymer (e.g. rubber) and the resultant rubber compositions (e.g. rubber compositions) may be used in/for gaskets, for example washing-machine gaskets.

Method of Making a Polymer Composition

There is provided herein a method of making a composition comprising a polymer and inorganic particulate material (e.g. diatomaceous earth).

The composition comprising a polymer and inorganic particulate material (e.g. diatomaceous earth) and/or the inorganic particulate material (e.g. diatomaceous earth) disclosed herein include not only the first and second aspects of the present invention, but also any of the embodiments disclosed herein, including any combination of these embodiments in all possible variations thereof.

The method of making a composition comprising a polymer and inorganic particulate material (e.g. diatomaceous earth) may comprise obtaining an inorganic particulate material (e.g. diatomaceous earth) having a surface area equal to or greater than about 30 $m^2g^{-1}$, and combining the inorganic particulate material (e.g. diatomaceous earth) with a polymer.

The obtaining an inorganic particulate material (e.g. diatomaceous earth) having a surface area equal to or greater than about 30 $m^2g^{-1}$ may comprise obtaining a commercially available inorganic particulate material (e.g. diatomaceous earth) having this surface area.

Alternatively, the obtaining an inorganic particulate material (e.g. diatomaceous earth) having a surface area equal to or greater than about 30 $m^2g^{-1}$ may comprise grinding a feed inorganic particulate material (e.g. diatomaceous earth) to obtain a desired surface area.

The work input during grinding may be up to 450 kwh/t. For example, the work input during grinding may be from about 50 kwh/t to about 450 kwh/t. For example, the work input during grinding may be from about 75 kwh/t to about 450 kwh/t, for example from about 80 kwh/t to about 450 kwh/t. For example, the work input during grinding may be from about 100 kwh/t to about 450 kwh/t, for example from about 150 kwh/t to about 450 kwh/t, for example from about 200 kwh/t to about 450 kwh/t, for example from about 250 kwh/t to about 450 kwh/t. For example, the work input during grinding may be from about 300 kwh/t to about 450 kwh/t.

The work input during grinding may be up to about 400 kwh/t. For example, the work input during grinding may be from about 50 kwh/t to about 400 kwh/t. For example, the work input during grinding may be from about 75 kwh/t to about 400 kwh/t, for example from about 80 kwh/t to about 400 kwh/t. For example, the work input during grinding may be from about 100 kwh/t to about 400 kwh/t, for example from about 150 kwh/t to about 400 kwh/t, for example from about 200 kwh/t to about 400 kwh/t, for example from about 250 kwh/t to about 400 kwh/t. For example, the work input during grinding may be from about 300 kwh/t to about 400 kwh/t.

The work input during grinding may be up to about 300 kwh/t. For example, the work input during grinding may be from about 50 kwh/t to about 300 kwh/t. For example, the work input during grinding may be from about 75 kwh/t to about 300 kwh/t, for example from about 80 kwh/t to about 300 kwh/t. For example, the work input during grinding may be from about 100 kwh/t to about 300 kwh/t, for example from about 150 kwh/t to about 300 kwh/t, for example from about 200 kwh/t to about 300 kwh/t, for example from about 250 kwh/t to about 300 kwh/t. For example, the work input during grinding may be from about 300 kwh/t to about 300 kwh/t.

The grinding is suitably performed in a conventional manner. The grinding may, for example, be an attrition grinding process in the presence of a particulate grinding medium, or may be an autogenous grinding process, i.e. one in the absence of a grinding medium. The grinding may, for example, be a wet grinding process.

The particulate grinding medium, when present, may be of a natural or a synthetic material. The grinding medium may, for example, comprise balls, beads or pellets of any hard mineral, ceramic or metallic material. Such materials may include, for example, alumina, zirconia, zirconium silicate, aluminium silicate or the mullite-rich material which is produced by calcining kaolinitic clay at a temperature in the range of from about 1300° C. to about 1800° C. Alternatively, particles of natural sand of a suitable particle size may be used.

Generally, the type of and particle size of grinding medium to be selected for use in the invention may be dependent on the properties, such as, e.g. the particle size of, and the chemical composition of, the feed suspension of inorganic material to be ground. Preferably, the particulate grinding medium comprises particles having an average diameter in the range of from about 0.1 mm to about 6.0 mm and, more preferably in the range of from about 0.2 mm to about 4.0 mm. The grinding medium (or media) may be present in an amount of from about 40% to about 70% by volume of the charge; and, more preferably in an amount from about 50% to about 60% by volume of the charge.

The grinding may be carried out in one or more stages. For example, the feed suspension may be partially ground in a first attrition grinder, the suspension of partially ground inorganic particulate material then being fed to a second attrition grinder for further grinding, after which the suspension of ground material may be fed to one or more subsequent attrition grinders.

After the grinding has been carried out, the suspension may be dewatered to a high solids suspension, and any grinding medium removed.

A high solids suspension formed by said dewatering may suitably have a solids level of the order of 70% or more by weight. One or more dispersing agents may optionally be used during and/or after grinding. The optional dispersing agent used at the post-grinding stage may be required to restrict flocculation of the particulate inorganic material in the high solids suspension. The optional dispersing agent may therefore be present in a dispersant-effective amount, for example from about 0.3% by weight of dry inorganic particulate, more preferably at least about 0.4% by weight, for example at least about 0.5% by weight.

The combining the inorganic particulate material (e.g. diatomaceous earth) with the polymer may be carried out by any suitable process known to a person skilled in the art. For example, a suitable compounding apparatus may be used. The compounding apparatus may comprise temperature control and a mixing device. For example, a Banbury™ rotary compounder may be used.

As will be well known to one of ordinary skill in this art, the compounding of rubber compositions typically proceeds in at least two stages, namely at least one so-called non-productive stage followed by a so-called productive mix stage. The blending of the rubber and the filler typically takes place in one or more non-productive stage.

A curing system may be mixed in the final "productive" stage, usually at a lower temperature and compounder speed than the temperature(s) and speed(s) of the preceding non-productive stage(s). The higher temperatures/speeds of the non-productive stages are generally necessary to serve the particular processing needs of the rubber and other components. For example, particulate silica fillers require a particularly high processing temperature, in the region of 140 to 165° C., for example between about 150 and about 165° C., to ensure correct compounding into the rubber composition.

There is usually a cooling and/or cold milling interval between at least some of the stages, for which the rubber composition (masterbatch) is dumped from the compounder. The masterbatch will then be returned to the compounder for the next stage. The final masterbatch is typically dumped from the compounder and allowed to cool before use.

An organosilane coupling agent component(s) may be added directly into the composition mixture during compounding of the rubber composition, or at least a portion of the organosilane coupling agent component(s) may be used to pre-treat the inorganic particulate material (e.g. diatomaceous earth) filler and/or some or all of any additional particulate filler component(s) prior to addition of the filler component(s) to the composition mixture.

For further details of typical compounding procedures, please refer to Okel et al "Advances in Precipitated Silicas for Passenger and Truck Tyre Treads", Progress in Rubber and Plastics Technology, Vol. 15, No. 1, 1999, the disclosure of which is incorporated herein by reference.

BRIEF DESCRIPTION OF THE DRAWINGS

Certain embodiments of the invention will now be described, by way of example only and without limitation, with reference to the following Figures and Examples, in which.

EXAMPLES

Example 1

Samples of diatomaceous earth were prepared from a commercially available feed diatomaceous earth slurry having a surface area of 26 $m^2g^{-1}$, a median particle size of 11.0 µm and a +325 mesh of 1.0% when measured using laser diffraction.

Figure 1:
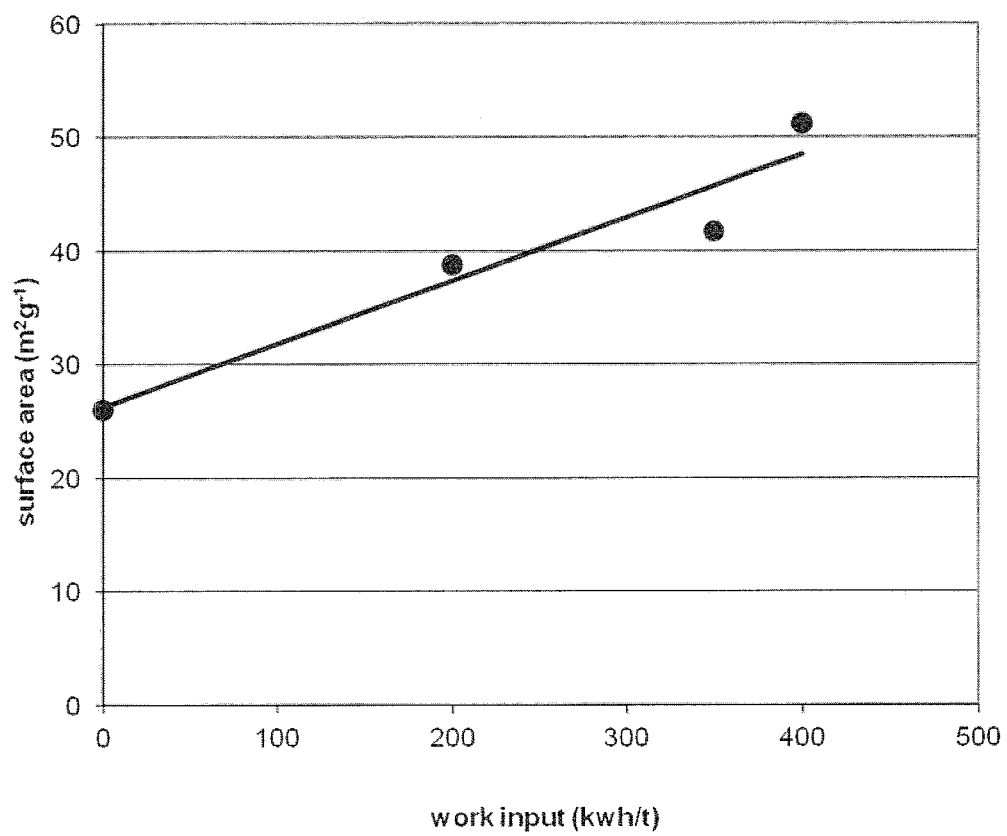
FIG. 1 shows the surface area of diatomaceous earth against the work input during grinding of a feed diatomaceous earth.
Figure 2:
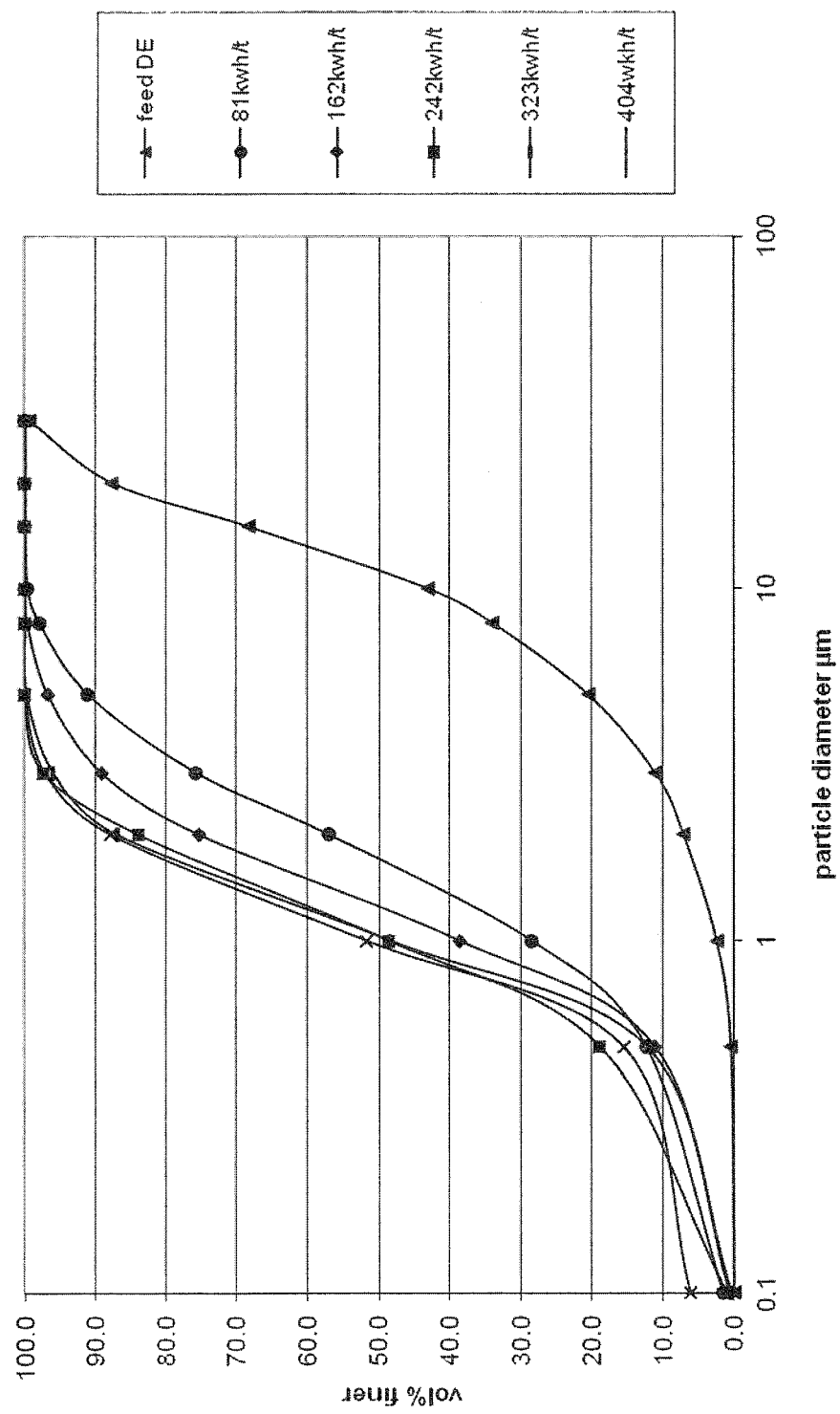
FIG. 2 shows the particle size distribution of various diatomaceous earth samples which have undergone grinding at different work input levels.

The feed diatomaceous earth was ground using 13 kg of Carbolite 16/20# grade ceramic grinding media (specific gravity of 2.71 $g/cm^3$) and an equivalent volume of the diatomaceous earth slurry having a solids content of 20 wt %. The media mill was run at 500 rpm and work input was measured using a calibrated load cell connected to a voltage/time integrator. Samples of the slurry were taken at various work inputs. The particle size distribution of these samples was determined using a CILAS model 1064LD laser diffraction instrument using the Fraunhofer approximation model to calculate the particle size distribution. Samples taken at various work inputs were filtered and dried at 80° C. The surface area of the dried powder was determined by nitrogen adsorption (BET) method. The results are shown in FIGS. 1 and 2 below. It was found that increasing work input during grinding reduces the particle sizes and provides concomitant increase in the surface area of the diatomaceous earth.

A sample of diatomaceous earth having a surface area of 42 $m^2g^{-1}$ and a $d_{50}$ of 1.1 µm was prepared by grinding the feed diatomaceous earth at a work input of 350 kwh/t. Rubber compositions comprising the feed diatomaceous earth and the diatomaceous earth sample having a surface area of 42 $m^2g^{-1}$ were prepared.

First, a master-batch of a rubber compound based on a styrene butadiene rubber was prepared in a model "BR" Banbury internal mixer. The composition comprised 100 phr (pounds per 100 pounds of resin) SBR 1502, 5 phr zinc oxide, 1 phr stearic acid, 1 phr CNS (Alken CNS—approximately 50% 2,2-methylene bis[6-(1-methylcyclohexyl)-p-cresol] and approximately 50% methyl mercapto-benzimidazole), 5 phr Pale Coumarone resin, 2.05 phr sulphur, 1.5 phr CBS (N-cyclohexyl-2-benzothiazole sulphenamide), 0.2 phr DPG (diphenyl guanidine). The zinc oxide, resin, stearic acid and CNS were added to the elastomer after 1 minute of mixing. Brush down occurred after 2 minutes of mixing. The cure system was added after 3 minutes of mixing. The composition was transferred to the mill at 100° C. after 4 minutes.

The diatomaceous earth samples were added to the master-batch at 90 phr with the addition of 3 phr digol using a two roll mill. The compounds were vulcanized at 165° C. for 20 minutes under 2500 PSI compression to produce molded rubber test sheets or test buttons. Test pieces for the various tensile strength and elongation at break tests were cut from the molded sheets.

Tensile strength and elongation at break measurements were made on test pieces of the type described as "die C" in ASTM D412. Tear tests were conducted on test pieces described as "die B" in ASTM D624 pre-cut with a 0.5 mm razor nick. Abrasion resistance testing was carried out on a SATRA model STM602 abrasion tester in general accordance with the DIN abrasion test. Results of these tests are given in Table 1.

TABLE 1

| Property | Composition comprising feed DE (26 $m^2g^{-1}$ surface area) | Composition comprising ground DE (41 $m^2g^{-1}$ surface area) | % change in property |
|---|---|---|---|
| Tensile strength (MPa) | 10.2 | 13.4 | +30 |
| Elongation at break (%) | 777 | 826 | +6 |
| Tear strength (N/mm) | 28.2 | 34.6 | +24 |
| Abrasion resistance (vol loss $mm^3$) | 380 | 328 | +14 |

The foregoing broadly describes certain embodiments of the present invention without limitation. Variations and modifications as will be readily apparent to those skilled in the art are intended to be within the scope of the present invention as defined in and by the appended claims.

The following numbered paragraphs defined particular embodiments of the present invention:

1. A polymer composition comprising a polymer and diatomaceous earth, wherein the diatomaceous earth has a surface area equal to or greater than about 30 $m^2g^{-1}$
2. The polymer composition of paragraph 1, wherein the polymer comprises a rubber.
3. The polymer composition of paragraph 2, wherein the rubber comprises a styrene butadiene rubber (SBR) and/or an epoxidized natural rubber (ENR).
4. The polymer composition of any one of paragraphs 1 to 3, wherein the diatomaceous earth has a surface area equal to or greater than about 40 $m^2g^{-1}$.
5. The polymer composition of any one of paragraphs 1 to 4, wherein the diatomaceous earth has a surface area up to and including about 60 $m^2g^{-1}$.
6. The polymer composition of any one of paragraphs 1 to 5, wherein the diatomaceous earth has a surface area up to and including about 50 $m^2g^{-1}$.
7. The polymer composition of any one of paragraphs 1 to 6, wherein at least about 90 vol %, for example at least about 95 vol %, of the particles of diatomaceous earth are smaller than about 5 μm.
8. The polymer composition of any one of paragraphs 1 to 7, wherein at least about 50 vol %, for example at least about 70 vol %, of the particles of diatomaceous earth are smaller than about 2 μm.
9. The polymer composition of any one of paragraphs 1 to 8, wherein at least about 20 vol %, for example at least about 35 vol %, of the particles of diatomaceous earth are smaller than about 1 μm.
10. The polymer composition of any one of paragraphs 1 to 9, wherein at least about 5 vol %, for example at least about 10 vol %, of the particles of diatomaceous earth are smaller than about 0.5 μm.
11. The polymer composition of any one of paragraphs 1 to 10, wherein the diatomaceous earth has a $d_{10}$ of less than about 1.0 μm, for example less than about 0.5 μm.
12. The polymer composition of any one of paragraphs 1 to 11, wherein the diatomaceous earth has a $d_{50}$ of less than about 5.0 μm, for example less than about 3.0 μm.
13. The polymer composition of any one of paragraphs 1 to 12, wherein the diatomaceous earth has a $d_{90}$ of less than about 8.0 μm, for example less than about 4.0 μm.
14. The polymer composition of any one of paragraphs 1 to 13, wherein the diatomaceous earth is present in the composition in an amount ranging from about 50 phr to about 200 phr.
15. The polymer composition of any one of paragraphs 1 to 14, wherein the composition has a tensile strength which is at least about 10%, for example at least about 20%, greater than the tensile strength of a corresponding composition in accordance with any one of paragraphs 1 to 14 in which the diatomaceous earth does not have a surface area equal to or greater than about 30 $m^2g^{-1}$.
16. The polymer composition of any one of paragraphs 1 to 15, wherein the composition has an elongation at break which is at least about 5% greater than the elongation at break of a corresponding composition in accordance with any one of paragraphs 1 to 15 in which the diatomaceous earth does not have a surface area equal to or greater than about 30 $m^2g^{-1}$.
17. The polymer composition of any one of paragraphs 1 to 16, wherein the composition has a tear strength which is at least about 10%, for example at least about 20%, greater than the tear strength of a corresponding composition in accordance with any one of paragraphs 1 to 16 in which the diatomaceous earth does not have a surface area equal to or greater than about 30 $m^2g^{-1}$.
18. The polymer composition of any one of paragraphs 1 to 17, wherein the composition has an abrasion resistance which is at least about 5%, for example at least about 10%, greater than the abrasion resistance of a corresponding composition in accordance with any one of paragraphs 1 to 17 in which the diatomaceous earth does not have a surface area equal to or greater than about 30 $m^2g^{-1}$.
19. The polymer composition of any one of paragraphs 2 to 18, wherein the composition has a tensile strength of equal to or greater than about 12 MPa.
20. The polymer composition of any one of paragraphs 2 to 19, wherein the composition has an elongation at break of equal to or greater than about 815%.
21. The polymer composition of any one of paragraphs 2 to 20, wherein the composition has a tear strength of equal to or greater than about 30 N/mm.
22. The polymer composition of any one of paragraphs 2 to 21, wherein the composition has an abrasion resistance of less than or equal to about 350 $mm^3$ volume loss.

23. Diatomaceous earth having a surface area equal to or greater than about 30 $m^2g^{-1}$.
24. The diatomaceous earth of paragraph 23, wherein the diatomaceous earth has a surface area equal to or greater than about 40 $m^2g^{-1}$.
25. The diatomaceous earth of paragraph 23 or 24, wherein the diatomaceous earth has a surface area up to and including about 60 $m^2g^{-1}$.
26. The diatomaceous earth of paragraph 23 or 24, wherein the diatomaceous earth has a surface area up to and including about 50 $m^2g^{-1}$.
27. The diatomaceous earth of any one of paragraphs 23 to 26, wherein at least about 90%, for example at least about 95%, of the particles are smaller than about 5 μm.
28. The diatomaceous earth of any one of paragraphs 23 to 27, wherein at least about 50%, for example at least about 70%, of the particles are smaller than about 2 μm.
29. The diatomaceous earth of any one of paragraphs 23 to 28, wherein at least about 20 vol %, for example at least about 35 vol %, of the particles are smaller than about 1 μm.
30. The diatomaceous earth of any one of paragraphs 23 to 29, wherein at least about 5 vol %, for example at least about 10 vol %, of the particles are smaller than about 0.5 μm.
31. The diatomaceous earth of any one of paragraphs 23 to 30, wherein the diatomaceous earth has a $d_{10}$ of less than about 1.0 μm, for example less than about 0.5 μm.
32. The diatomaceous earth of any one of paragraphs 23 to 31, wherein the diatomaceous earth has a $d_{50}$ of less than about 5.0 μm, for example less than about 3.0 μm.
33. The diatomaceous earth of any one of paragraphs 23 to 32, wherein the diatomaceous earth has a $d_{90}$ of less than about 8.0 μm, for example less than about 4.0 μm.
34. Use of a diatomaceous earth having a surface area equal to or greater than about 30 $m^2g^{-1}$ as a filler in a composition comprising a polymer.
35. The use of paragraph 34, wherein the polymer comprises a rubber.
36. The use of paragraph 35, wherein the rubber comprises a styrene butadiene rubber (SBR) and/or an epoxidized natural rubber (ENR).
37. The use of any one of paragraphs 34 to 36, wherein the diatomaceous earth has a surface area equal to or greater than about 40 $m^2g^{-1}$.
38. The use of any one of paragraphs 34 to 37, wherein the diatomaceous earth has a surface area up to and including about 60 $m^2g^{-1}$.
39. The use of any one of paragraphs 34 to 38, wherein the diatomaceous earth has a surface area up to and including about 50 $m^2g^{-1}$.
40. The use of any one of paragraphs 34 to 39, wherein at least about 90 vol %, for example at least about 95 vol %, of the particles of diatomaceous earth are smaller than about 5 μm.
41. The use of any one of paragraphs 34 to 40, wherein at least about 50 vol %, for example at least about 70 vol % of the particles of diatomaceous earth are smaller than about 2 μm.
42. The use of any one of paragraphs 34 to 41, wherein at least about 20 vol %, for example at least about 35 vol %, of the particles of diatomaceous earth are smaller than about 1 μm.
43. The use of any one of paragraphs 34 to 42, wherein at least about 5 vol %, for example at least about 10 vol %, of the particles of diatomaceous earth are smaller than about 0.5 μm.
44. The use of any one of paragraphs 34 to 43, wherein the diatomaceous earth has a $d_{10}$ of less than about 1.0 μm, for example less than about 0.5 μm.
45. The use of any one of paragraphs 34 to 44, wherein the diatomaceous earth has a $d_{50}$ of less than about 5.0 μm, for example less than about 3.0 μm.
46. The use of any one of paragraphs 34 to 45, wherein the diatomaceous earth has a $d_{90}$ of less than about 8.0 μm, for example less than about 4.0 μm.
47. The use of any one of paragraphs 34 to 46, wherein the diatomaceous earth is present in the composition in an amount ranging from about 50 phr to about 200 phr.
48. The use of any one of paragraphs 34 to 47, wherein the composition has a tensile strength which is at least about 10%, for example at least about 20%, greater than the tensile strength of a corresponding composition in accordance with any one of paragraphs 34 to 47 in which the diatomaceous earth does not have a surface area equal to or greater than about 30 $m^2g^{-1}$.
49. The use of any one of paragraphs 34 to 48, wherein the composition has a elongation at break which is at least about 5% greater than the elongation at break of a corresponding composition in accordance with any one of paragraphs 34 to 48 in which the diatomaceous earth does not have a surface area equal to or greater than about 30 $m^2g^{-1}$.
50. The use of any one of paragraphs 34 to 49, wherein the composition has a tear strength which is at least about 10%, for example at least about 20%, greater than the tear strength of a corresponding composition in accordance with any one of paragraphs 34 to 49 in which the diatomaceous earth does not have a surface area equal to or greater than about 30 $m^2g^{-1}$.
51. The use of any one of paragraphs 34 to 50, wherein the composition has an abrasion resistance which is at least about 5%, for example at least about 10%, greater than the abrasion resistance of a corresponding composition in accordance with any one of paragraphs 34 to 50 in which the diatomaceous earth does not have a surface area equal to or greater than about 30 $m^2g^{-1}$.
52. The use of any one of paragraphs 34 to 51, wherein the composition has a tensile strength of greater than or equal to about 12 MPa.
53. The use of any one of paragraphs 34 to 52, wherein the composition has an elongation at break of greater than or equal to about 815%.
54. The use of any one of paragraphs 34 to 53, wherein the composition has a tear strength of greater than or equal to about 30 N/mm.
55. The use of any one of paragraphs 34 to 54, wherein the composition has an abrasion resistance of equal to or less than about 350 $mm^3$ volume loss.
56. The use of any one of paragraphs 34 to 55, wherein the diatomaceous earth assists in improving one or more of tensile strength, elongation at break, tear strength and abrasion resistance of the polymer composition.
57. The use of any one of paragraphs 34 to 56, wherein the composition is used as a sealant.
58. A method of making a composition of any one of paragraphs 1 to 22 comprising:
obtaining a diatomaceous earth as specified in any one of paragraphs 23 to 33; and
combining the diatomaceous earth with a polymer.
59. The method of paragraph 58, wherein a diatomaceous earth having a surface area as specified in any one of paragraphs 23 to 33 is obtained by grinding a feed diatomaceous earth.

60. The method of paragraph 59, wherein the work input is up to about 450 kwh/t.

61. A method of making a diatomaceous earth of any one of paragraphs 23 to 33 comprising grinding a feed diatomaceous earth.

62. The method of paragraph 61, wherein the work input is up to about 450 kwh/t.

63. An article or product formed from a polymer composition in accordance with any one of paragraphs 1 to 22.

64. An article or product of paragraph 63, wherein the article or product is selected from a tyre, for example a vehicle tyre, or a gasket.

65. An article or product of paragraph 64, wherein the article or product is selected from a side wall of a vehicle tyre, a tyre tread, or a washing machine gasket.

The invention claimed is:

1. A polymer composition comprising a polymer and particles of ground diatomaceous earth, wherein the particles of ground diatomaceous earth have a surface area equal to or greater than about 30 $m^2g^{-1}$, wherein:
   (a) at least about 90 vol % of the particles of ground diatomaceous earth are smaller than about 5 μm;
   (b) at least about 50 vol % of the particles of ground diatomaceous earth are smaller than about 2 μm;
   (c) at least about 20 vol % of the particles of ground diatomaceous earth are smaller than about 1 μm; and
   (d) at least about 10 vol % of the particles of ground diatomaceous earth are smaller than about 0.5 μm.

2. The polymer composition of claim 1, wherein the polymer comprises a rubber, the rubber comprising a styrene butadiene rubber (SBR) and/or an epoxidized natural rubber (ENR).

3. The polymer composition of claim 1, wherein the particles of ground diatomaceous earth have a surface area equal to or greater than about 40 $m^2g^{-1}$.

4. The polymer composition of claim 1, wherein the composition has a tensile strength equal or greater than about 12 MPa.

5. The polymer composition of claim 1, wherein the composition has an elongation at break equal to or greater than about 815%.

6. The polymer composition of claim 1, wherein the composition has a tear strength equal to or greater than about 30 N/mm.

7. The polymer composition of claim 1, wherein the composition has an abrasion resistance less than or equal to about 350 $mm^3$ volume loss.

8. A method of making a composition, comprising:
   obtaining particles of ground diatomaceous earth having a surface area equal to or greater than about 30 $m^2g^{-1}$ wherein:
   (a) at least about 90 vol % of the particles of ground diatomaceous earth are smaller than about 5 μm;
   (b) at least about 50 vol % of the particles of ground diatomaceous earth are smaller than about 2 μm;
   (c) at least about 20 vol % of the particles of ground diatomaceous earth are smaller than about 1 μm; and
   (d) at least about 10 vol % of the particles of ground diatomaceous earth are smaller than about 0.5 μm; and
   combining the particles of ground diatomaceous earth with a polymer.

9. The method of claim 8, wherein the particles of ground diatomaceous earth are obtained by grinding a feed diatomaceous earth.

10. The method of claim 9, wherein work input is up to about 450 kwh/t.

11. A polymer composition comprising a polymer and particles of ground diatomaceous earth, wherein the particles of ground diatomaceous earth have a surface area equal to or greater than about 30 $m^eg^{-1}$;
   wherein:
   (a) at least about 90 vol % of the particles of ground diatomaceous earth are smaller than about 5 μm;
   (b) at least about 50 vol % of the particles of ground diatomaceous earth are smaller than about 2 μm;
   (c) at least about 20 vol % of the particles of ground diatomaceous earth are smaller than about 1 μm; and
   (d) at least about 10 vol % of the particles of ground diatomaceous earth are smaller than about 0.5 μm;
   wherein the composition has a tensile strength equal or greater than about 12 MPa; and
   wherein the tensile strength is at least 10% greater than the tensile strength of a corresponding composition in which the particles of ground diatomaceous earth do not have a surface area equal to or greater than about 30 $m^2g^{-1}$.

12. A polymer composition comprising a polymer and particles of ground diatomaceous earth, wherein the particles of ground diatomaceous earth have a surface area equal to or greater than about 30 $m^2g^{-1}$;
   wherein:
   (a) at least about 90 vol % of the particles of ground diatomaceous earth are smaller than about 5 μm;
   (b) at least about 50 vol % of the particles of ground diatomaceous earth are smaller than about 2 μm;
   (c) at least about 20 vol % of the particles of ground diatomaceous earth are smaller than about 1 μm; and
   (d) at least about 10 vol % of the particles of ground diatomaceous earth are smaller than about 0.5 μm;
   wherein the composition has an elongation at break equal to or greater than about 815%; and
   wherein the elongation at break is at least about 5% greater than the elongation at break of a corresponding composition in which the particles of ground diatomaceous earth do not have a surface area equal to or greater than about 30 $m^2g^{-1}$.

13. A polymer composition comprising a polymer and particles of ground diatomaceous earth, wherein the particles of ground diatomaceous earth have a surface area equal to or greater than about 30 $m^2g^{-1}$;
   wherein:
   (a) at least about 90 vol % of the particles of ground diatomaceous earth are smaller than about 5 μm;
   (b) at least about 50 vol % of the particles of ground diatomaceous earth are smaller than about 2 μm;
   (c) at least about 20 vol % of the particles of ground diatomaceous earth are smaller than about 1 μm; and
   (d) at least about 10 vol % of the particles of ground diatomaceous earth are smaller than about 0.5 μm;
   wherein the composition has a tear strength equal to or greater than about 30 N/mm; and
   wherein the tear strength is at least about 10% greater than the tear strength of a corresponding composition in which the particles of ground diatomaceous earth do not have a surface area equal to or greater than about 30 $m^2g^{-1}$.

14. A polymer composition comprising a polymer and particles of ground diatomaceous earth, wherein the particles of ground diatomaceous earth have a surface area equal to or greater than about 30 $m^2g^{-1}$;
   wherein:
   (a) at least about 90 vol % of the particles of ground diatomaceous earth are smaller than about 5 μm;

(b) at least about 50 vol % of the particles of ground diatomaceous earth are smaller than about 2 μm;
(c) at least about 20 vol % of the particles of ground diatomaceous earth are smaller than about 1 μm; and
(d) at least about 10 vol % of the particles of ground diatomaceous earth are smaller than about 0.5 μm;

wherein the composition has an abrasion resistance less than or equal to about 350 mm$^3$ volume loss; and wherein the abrasion resistance is at least about 5% greater than the abrasion resistance of a corresponding composition in which the particles of ground diatomaceous earth do not have a surface area equal to or greater than about 30 m$^2$g$^{-1}$.

* * * * *